United States Patent
Gomi et al.

(10) Patent No.: US 12,392,901 B2
(45) Date of Patent: Aug. 19, 2025

(54) IN-VEHICLE IMAGING APPARATUS

(71) Applicant: KOITO MANUFACTURING CO., LTD., Tokyo (JP)

(72) Inventors: Masato Gomi, Shizuoka (JP); Shintaro Sugimoto, Shizuoka (JP); Yuta Haruse, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 1069 days.

(21) Appl. No.: 17/377,456

(22) Filed: Jul. 16, 2021

(65) Prior Publication Data

US 2021/0341618 A1    Nov. 4, 2021

Related U.S. Application Data

(63) Continuation of application No. PCT/JP2019/051193, filed on Dec. 26, 2019.

(30) Foreign Application Priority Data

Jan. 17, 2019 (JP) .................. 2019-006086

(51) Int. Cl.
*G01S 17/00* (2020.01)
*B60Q 1/04* (2006.01)
(Continued)

(52) U.S. Cl.
CPC ............. *G01S 17/89* (2013.01); *B60Q 1/04* (2013.01); *G01S 7/4861* (2013.01)

(58) Field of Classification Search
USPC ...................................... 356/4.01
See application file for complete search history.

(56) References Cited

U.S. PATENT DOCUMENTS 8,797,522 B2 * 8/2014 Namba ................ H04N 25/773
356/226
10,302,766 B2 * 5/2019 Ito ......................... G01S 17/931
(Continued)

FOREIGN PATENT DOCUMENTS

CN   105723239 A   6/2016
CN   108363069 A   8/2018
(Continued)

OTHER PUBLICATIONS

International Search Report (Form PCT/ISA/210) issued on Mar. 17, 2020, in corresponding International Application No. PCT/JP2019/051193. (6 pages).

(Continued)

*Primary Examiner* — James R Hulka
(74) *Attorney, Agent, or Firm* — BUCHANAN, INGERSOLL & ROONEY PC

(57) ABSTRACT

An illumination apparatus irradiates an object with a reference light having a random pattern to be switched for each illumination period $T_{ILM}$. A photodetector detects reflected light from the object. A processing device reconstructs a reconstructed image of the object based on the detection intensity based on the output of the photodetector and the light intensity distribution of the reference light. An interval period $T_{INT}$ in which the light intensity of the reference light is zero or the reference light has a uniform light intensity distribution is inserted between an irradiation period $T_{ILM}$ and the next irradiation period $T_{ILM}$. With the upper limit of the sensing distance in the depth direction of the in-vehicle imaging apparatus as $L_{MAX}$, and with the speed of light as c, the interval period $T_{INT}$ is designed to be equal to or larger than $2 \times L_{MAX}/c$.

7 Claims, 8 Drawing Sheets

(51) Int. Cl.
*G01S 7/4861* (2020.01)
*G01S 17/89* (2020.01)

(56) References Cited

U.S. PATENT DOCUMENTS

| | | | |
|---|---|---|---|
| 10,486,584 B2 * | 11/2019 | Mouri | F21S 41/147 |
| 10,718,868 B2 * | 7/2020 | Hirota | H04N 7/183 |
| 10,739,446 B2 * | 8/2020 | Itoh | G01S 17/10 |
| 11,194,023 B2 * | 12/2021 | Mano | G01S 17/42 |
| 2013/0114073 A1 | 5/2013 | Namba et al. | |
| 2016/0259057 A1 | 9/2016 | Ito | |
| 2017/0212224 A1 | 7/2017 | Itoh et al. | |
| 2018/0264990 A1 | 9/2018 | Mouri et al. | |
| 2019/0004150 A1 | 1/2019 | Mano et al. | |
| 2020/0150276 A1 | 5/2020 | Hirota | |

FOREIGN PATENT DOCUMENTS

| | | | | |
|---|---|---|---|---|
| EP | 3998767 A1 * | 5/2022 | | B60Q 1/0023 |
| JP | 2012-037267 A | 2/2012 | | |
| JP | 2013-096905 A | 5/2013 | | |
| JP | 2017133853 A | 8/2017 | | |
| JP | 2017-525952 A | 9/2017 | | |
| JP | 2018-156862 A | 10/2018 | | |
| JP | 6412673 B1 | 10/2018 | | |
| WO | 2016/025055 A1 | 2/2016 | | |
| WO | 2016/208215 A1 | 12/2016 | | |
| WO | 2017/110417 A1 | 6/2017 | | |
| WO | 2017187484 A1 | 11/2017 | | |
| WO | WO-2019016968 A1 * | 1/2019 | | G01S 17/10 |
| WO | WO-2019016994 A1 * | 1/2019 | | G01S 17/10 |

OTHER PUBLICATIONS

International Preliminary Report on Patentability (Form PCT/IB/373) and the Written Opinion of the International Searching Authority (Form PCT/ISA/237) issued on Jun. 16, 2021, in corresponding International Application No. PCT/JP2019/051193. (19 pages).

Office Action (Notification of the First Office Action) issued on Feb. 29, 2024, in corresponding Chinese Patent Application No. 201980089167.0 and English translation of the Office Action. (19 pages).

Office Action (Notification of Reason(s) for Refusal) issued on Jun. 20, 2023, in corresponding Japanese Patent Application No. 2020-566186 and English translation of the Office Action. (10 pages).

Office Action (Notification of Reason(s) for Refusal) issued on Oct. 31, 2023, in corresponding Japanese Patent Application No. 2020-566186 and English machine translation of the Office Action. (7 pages).

* cited by examiner

IN-VEHICLE IMAGING APPARATUS

BACKGROUND

1. Technical Field

The present disclosure relates to an in-vehicle imaging apparatus.

2. Description of Related Art

Background Art

In order to support autonomous driving or autonomous control of the light distribution of a headlamp, an object identification system is employed for sensing the position and the kind of an object that exists in the vicinity of a vehicle. The object identification system includes a sensor and a processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

As one from among imaging apparatuses (sensors), an imaging apparatus using the principle of ghost imaging is known. In ghost imaging, reference light is irradiated to an object while randomly switching the light intensity distribution (pattern) of the reference light, and the light intensity of the reflected light is detected in a form associated with each random light distribution pattern. The light intensity is detected as the energy over a given plane or the integrated value of the light intensity. That is to say, the light intensity is not detected as a light intensity distribution. With this, by calculating the correlation between each pattern and the detected light intensity, a reconstructed image of the object is reconstructed.

As a result of investigating an in-vehicle imaging apparatus, the present inventor has recognized the following problem.

In conventional usages of imaging apparatuses such as the field of cell observation or the like, the distance between the imaging apparatus and a subject is approximately constant. In other words, the range in which the object can exist in the depth direction is markedly limited. In order to provide reduced measurement time or in order to raise the frame rate, the interval (idle period) between the random patterns of the reference light is preferably as short as possible. In a case in which the subject exists in a narrow range, no problem occurs even with such a short interval.

In contrast, in a case in which the imaging apparatus is configured as an in-vehicle imaging apparatus, the subject (object) can exist at various distances. In other words, such an object can exist in a very wide range in the depth direction. FIG. 1 is a diagram for explaining measurement of an object by a conventional imaging apparatus 1. An illumination apparatus 2 switches the pattern PTN of reference light S1 at very short intervals (substantially zero). For example, in a case in which the pattern switching frequency is designed to be 400 Hz, an illumination time $T_{ILM}$ of 2 ms continues for each pattern. A photodetector 4 detects reflected light S2_1 and S2_2 reflected from objects OBJ1 and OBJ2 during a predetermined detection period (exposure time or integrating period) $T_{DET}$.

FIG. 2 is a time chart for explaining the operation of the imaging apparatus 1 in a situation shown in FIG. 1. In a case in which multiple objects exist at different distances, as the distance to an object becomes longer, the time (round-trip time) from a time point at which the reference light S1 is irradiated at the same timing to a time point at which the reflected light S2 that occurs due to the reflection of the reference light S1 by the object OBJ reaches the photodetector 4 becomes longer even if the reference light S1 is irradiated at the same timing. In the example shown in FIG. 1, the distances to the objects OBJ1 and OBJ2 are 1.5 m and 60 m, respectively. In this case, the light round-trip times are 10 ns and 40 ns, respectively. Accordingly, the reflected light S2_2 is input to the photodetector 4 with a delay with respect to the reflected light S2_1. As a result, in a beginning portion of the second detection period $T_{DET2}$, a component of the reflected light S2_2 (hatched portion) that occurs due to the reflection of the previous pattern $PIN_1$ by the object OBJ2 is detected. That is to say, interference occurs between the temporally adjacent random patterns, leading to degradation of the image quality.

SUMMARY

The present disclosure has been made in view of such a situation. Accordingly, it is an exemplary purpose of an embodiment of the present disclosure to provide an in-vehicle imaging apparatus with improved image quality.

An embodiment of the present disclosure relates to an in-vehicle imaging apparatus. The in-vehicle imaging apparatus includes: an illumination apparatus structured to irradiate reference light having a random pattern to be switched for each illumination period; a photodetector structured to detect reflected light from an object; and a processing device structured to calculate the correlation between the detection intensity based on the detection signal output from the photodetector and the light intensity distribution of the reference light so as to reconstruct a reconstructed image of the object. An interval period in which the light intensity of the reference light is set to zero or the reference light has a uniform spatial light intensity distribution is inserted between irradiation periods. With an upper limit of the sensing distance in the depth direction of the in-vehicle imaging apparatus as $L_{MAX}$, and with the speed of light as c, the interval period is designed to be equal to or larger than $2 \times L/c$.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
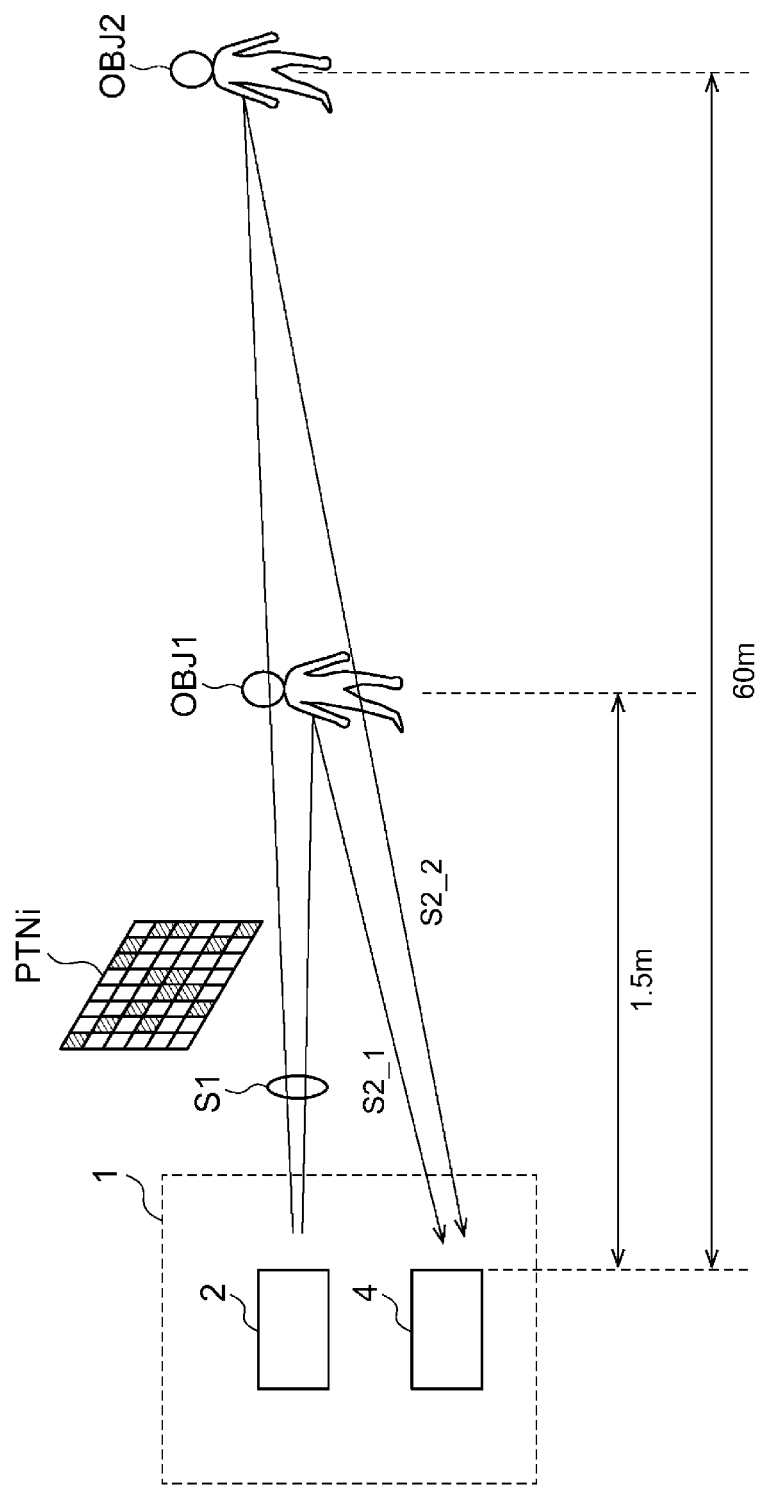
FIG. 1 is a diagram for explaining the measurement of an object by a conventional imaging apparatus.
Figure 2:
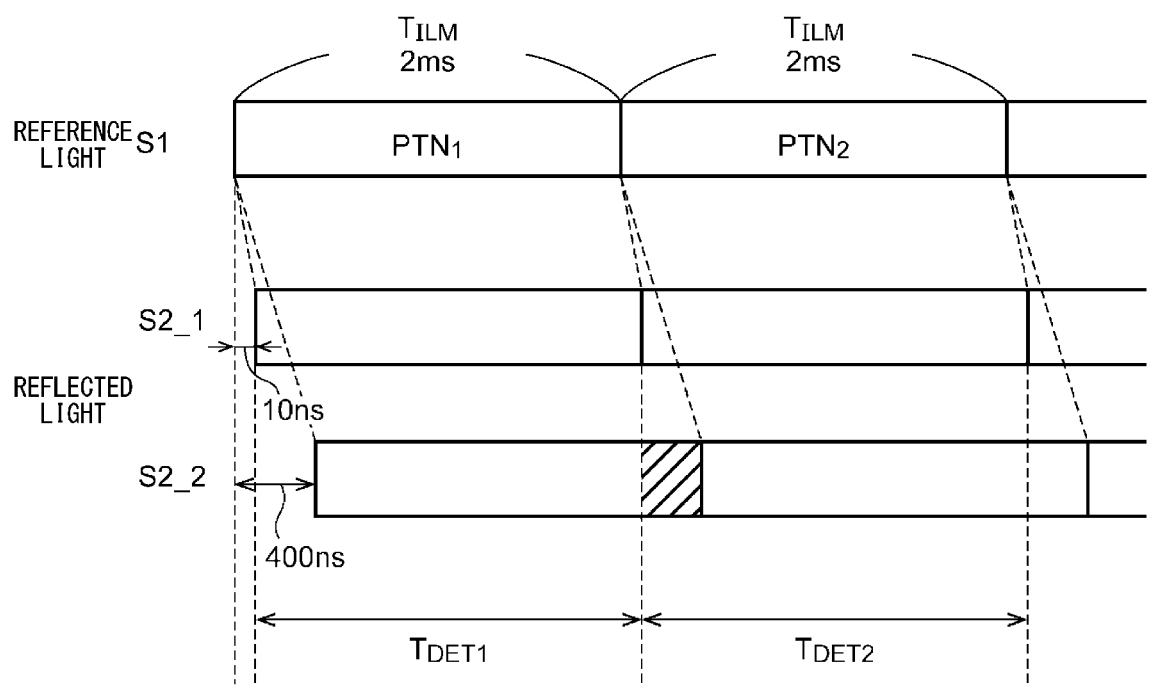
FIG. 2 is a time chart for explaining the operation of the imaging apparatus in a situation shown in FIG. 1.

An outline of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

An in-vehicle imaging apparatus according to one embodiment includes: an illumination apparatus structured to irradiate reference light having a random pattern to be switched for each illumination period; a photodetector structured to detect reflected light from an object; and a processing device structured to calculate the correlation between the detection intensity based on the detection signal output from the photodetector and the light intensity distribution of the reference light so as to reconstruct a reconstructed image of the object. An interval period in which the light intensity of the reference light is set to zero or the reference light has a uniform spatial light intensity distribution is provided is inserted between irradiation periods. With an upper limit of the sensing distance in the depth direction of the in-vehicle imaging apparatus as $L_{MAX}$, and with the speed of light as c, the interval period is designed to be equal to or larger than $2 \times L_{MAX}/c$. This arrangement is capable of preventing the occurrence of interference across different random patterns, thereby providing improved image quality.

In one embodiment, the processing device may reconstruct a reconstructed image using the detection intensity acquired in a period in which the detection signal is larger than a threshold value.

In one embodiment, when the detection signal exceeds a threshold value, the processing device may start a detection period. The detection intensity to be used for the correlation calculation is generated based on the detection signal acquired in the detection period. An increase in the detection signal indicates the arrival of the reflected light from the nearest-side object. Accordingly, an increase in the detection signal is employed as a trigger for starting the generation of the detection intensity. This allows the acquisition of unnecessary light to be reduced, thereby allowing the effects of noise or the like to be reduced.

In one embodiment, when the detection signal becomes lower than a threshold value, the processing device may end the detection period. A decrease in the detection signal indicates the arrival of the reflected light from the farthest-side object. Accordingly, a decrease in the detection signal is employed as a trigger for ending the generation of the detection intensity. This allows the acquisition of unnecessary light to be reduced, thereby allowing the effects of noise or the like to be reduced.

In one embodiment, the threshold value may be set based on the detection intensity acquired in the interval period.

In one embodiment, in the interval period, the reference light may have a light intensity of zero. Also, the processing device may correct the detection intensity to be used for reconstruction of the reconstructed image using the detection signal acquired in the interval period. The detection signal acquired in the interval period represents a noise component due to ambient light. Accordingly, the detection intensity that corresponds to a random pattern is corrected using the detection signal thus acquired in the interval period. This allows the effects of ambient light to be reduced, thereby providing improved image quality.

In one embodiment, the illumination period and the interval period may have an equal length. In this case, the noise correction processing can be simplified.

EMBODIMENTS

Description will be made below regarding preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the disclosure and the present invention. Also, it is not necessarily essential for the disclosure and the present invention that all the features or a combination thereof be provided as described in the embodiments.

The "random light intensity distribution" in the present specification does not mean that the light intensity distribution is completely random. Rather, the light intensity distribution may be random to an extent that allows an image to be reconstructed by ghost imaging. Accordingly, "random" in the present specification may include a certain degree of regularity. Also, "random" does not require the light intensity to be completely unpredictable. That is to say, the light intensity may also be predictable and reproducible.

Figure 3:
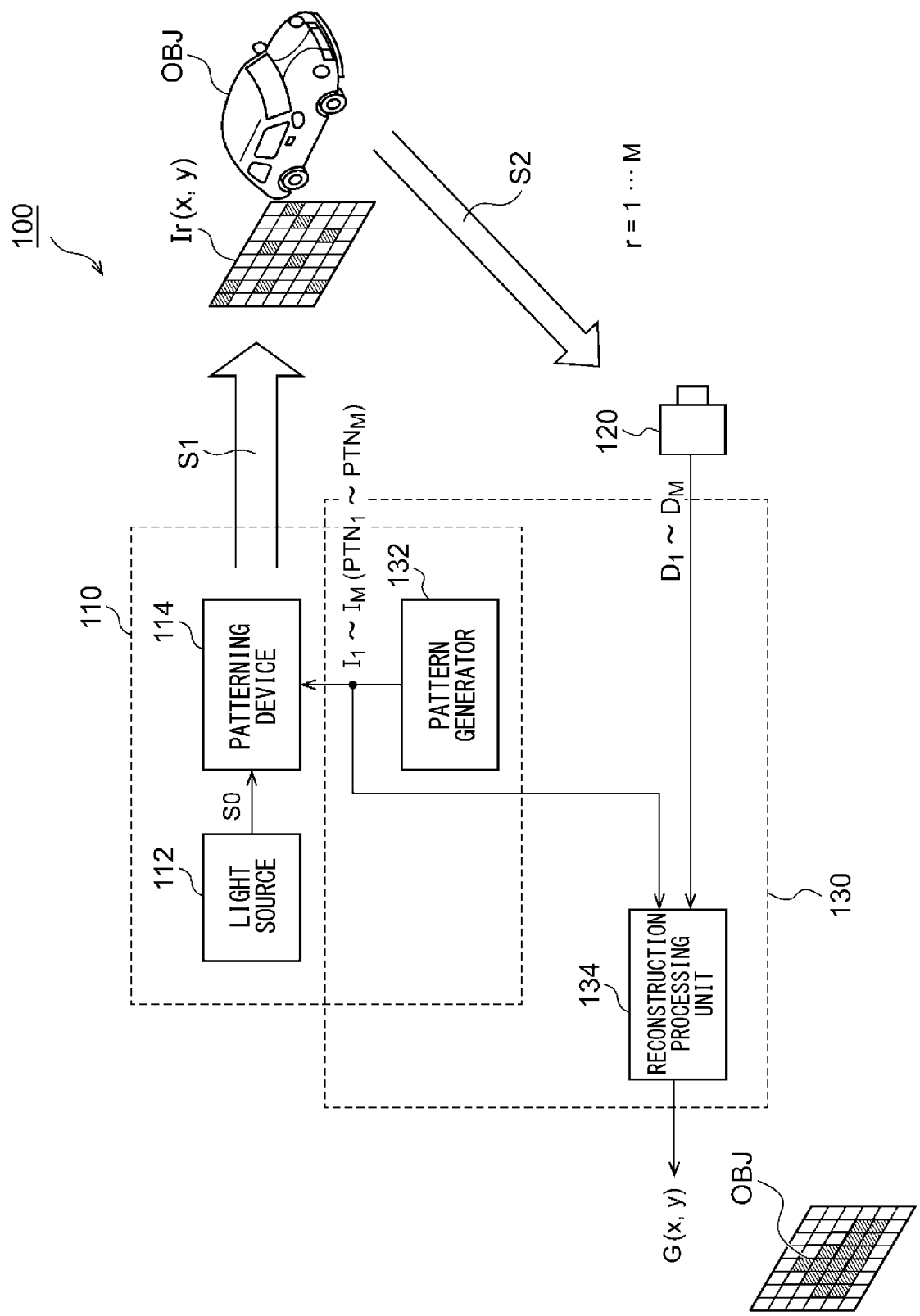
FIG. 3 is a diagram showing an imaging apparatus according to an embodiment.

FIG. 3 is a diagram showing an imaging apparatus 100 according to an embodiment. The imaging apparatus 100 is configured as an image sensor using the principle of ghost imaging. The imaging apparatus 100 includes an illumination apparatus 110, a photodetector 120, and a processing device 130. The imaging apparatus 100 will also be referred to as a "quantum radar camera".

The illumination apparatus 110 is configured as a pseudo-thermal light source. The illumination apparatus 110 generates reference light S1 having a light intensity distribution I(x, y) that can be regarded as substantially random, and irradiates the reference light S1 to an object OBJ. The reference light S1 is irradiated to the object OBJ with a light intensity distribution that is changed at random a multiple of M times.

The illumination apparatus 110 includes a light source 112, a patterning device 114, and a pattern generator 132. The light source 112 generates light S0 having a uniform light intensity distribution. As the light source 112, a laser, a light-emitting diode, or the like, may be employed. The wavelength and the spectrum of the reference light S1 are not restricted in particular. As the reference light S1, white light having multiple wavelengths or a continuous spectrum may be employed. Also, monochromatic light having a predetermined wavelength may be employed. The reference light S1 may also have a wavelength in the infrared region or ultraviolet region.

The patterning device 114 has multiple pixels arranged in a matrix. The patterning device 114 is configured to be capable of spatially modulating the light intensity distribution I based on the combination of the on/off states of the multiple pixels. In the present specification, a pixel set to the on state will be referred to as an "on pixel". On the other hand, a pixel set to the off state will be referred to as an "off pixel". It should be noted that, in the following description, for ease of understanding, description will be made assuming that each pixel is settable to only two values, i.e., 1 and 0. However, the present invention is not restricted to such an arrangement. Also, each pixel may be settable to an intermediate value.

As the patterning device 114, a reflective Digital Micromirror Device (DMD) or a transmissive liquid crystal device may be employed. The patterning device 114 receives the supply of a pattern signal PTN (image data) generated by the pattern generator 132.

The pattern generator 132 generates a pattern signal PTNr that indicates the light intensity distribution Ir of the reference light S1. The pattern generator 132 switches the pattern signal PTNr (r=1, 2, . . . , M) with time.

The photodetector 120 detects the reflected light from the object OBJ, and outputs a detection signal Dr. The detection signal Dr is a spatially integrated value of the light energy (or intensity) input to the photodetector 120 when reference light having the light intensity distribution Ir is irradiated to the object OBJ. Accordingly, as the photodetector 120, a single-pixel photodetector can be employed. The photodetector 120 outputs multiple detection signals $D_1$ through $D_M$ that respectively correspond to the multiple of M kinds of light intensity distributions $I_1$ through $I_M$.

The processing device 130 includes a pattern generator 132 and a reconstruction processing unit 134. The reconstruction processing unit 134 calculates the correlation between the multiple light intensity distributions (which will also be referred to as "random patterns") $I_1$ through $I_M$ and multiple detection intensities $b_1$ through $b_M$, so as to reconstruct a reconstructed image G(x, y) of the object OBJ.

The detection intensities $b_1$ through $b_M$ are acquired based on the detection signal $D_1$ through $D_M$. The relation between the detection intensity and the detection signal may preferably be determined giving consideration to the kind of the photodetector 120, the method of detection, etc.

Description will be made assuming that the reference light S1 having a given light intensity distribution Ir is irradiated for a given illumination period $T_{ILM}$. Also, description will be made assuming that the detection signal Dr represents an amount of light received at a given time point (or for an infinitesimal time), i.e., an instantaneous value thereof. In this case, the detection signal Dr may be sampled multiple times in a detection period $T_{DET}$ that corresponds to the illumination period $T_{ILM}$. Also, as the detection intensity br, an integrated value, an average value, or the maximum value of the detection signal Dr may be employed. Alternatively, from among all the sampled values, some may be selected and used to calculate such an integrated value, average value, or maximum value. For the selection of the multiple sampled values, x-th through y-th sampled values may be extracted in descending order from the maximum value. Also, sampled values that are smaller than an arbitrary threshold value may be excluded. Also, sampled values with small signal fluctuation may be extracted.

In a case in which, as the photodetector 120, a device such as a camera that is capable of setting an exposure time and of specifying the start of exposure is employed, the output Dr of the photodetector 120 may be directly used as the detection intensity br.

The conversion from the detection signal Dr to the detection intensity br may be executed by the processing device 130 or an external component of the processing device 130.

The correlation is calculated using a correlation function represented by the following Expression (1). Here, Ir represents the r-th light intensity distribution, and br represents the value of the r-th detection intensity.

[Expression 1]

$$G(x, y) = \frac{1}{M} \sum_{r=1}^{M} [\{b_r - \langle b \rangle\} \cdot I_r(x, y)] \quad (1)$$

$$\langle b \rangle = \frac{1}{M} \sum_{r=1}^{M} b_r$$

The processing device 130 can be implemented as a combination of a processor (hardware component) such as a Central Processing Unit (CPU), Micro Processing Unit (MCU), microcontroller or the like and a software program to be executed by the processor (hardware component). The processing device 130 may be configured as a combination of multiple processors. Alternatively, the processing device 130 may be configured as hardware only.

In the present embodiment, an interval period having a spatial light intensity distribution of zero (i.e., all the pixels are turned off) is inserted between a random pattern and a random pattern. With the upper limit of the sensing distance in the depth direction supported by the imaging apparatus 100 as $L_{MAX}$, and with the speed of light as c, the interval period $T_{INT}$ is determined to be larger than (2×L/C).

The above is the configuration of the imaging apparatus 100. Next, description will be made regarding the operation thereof.

Figure 4:
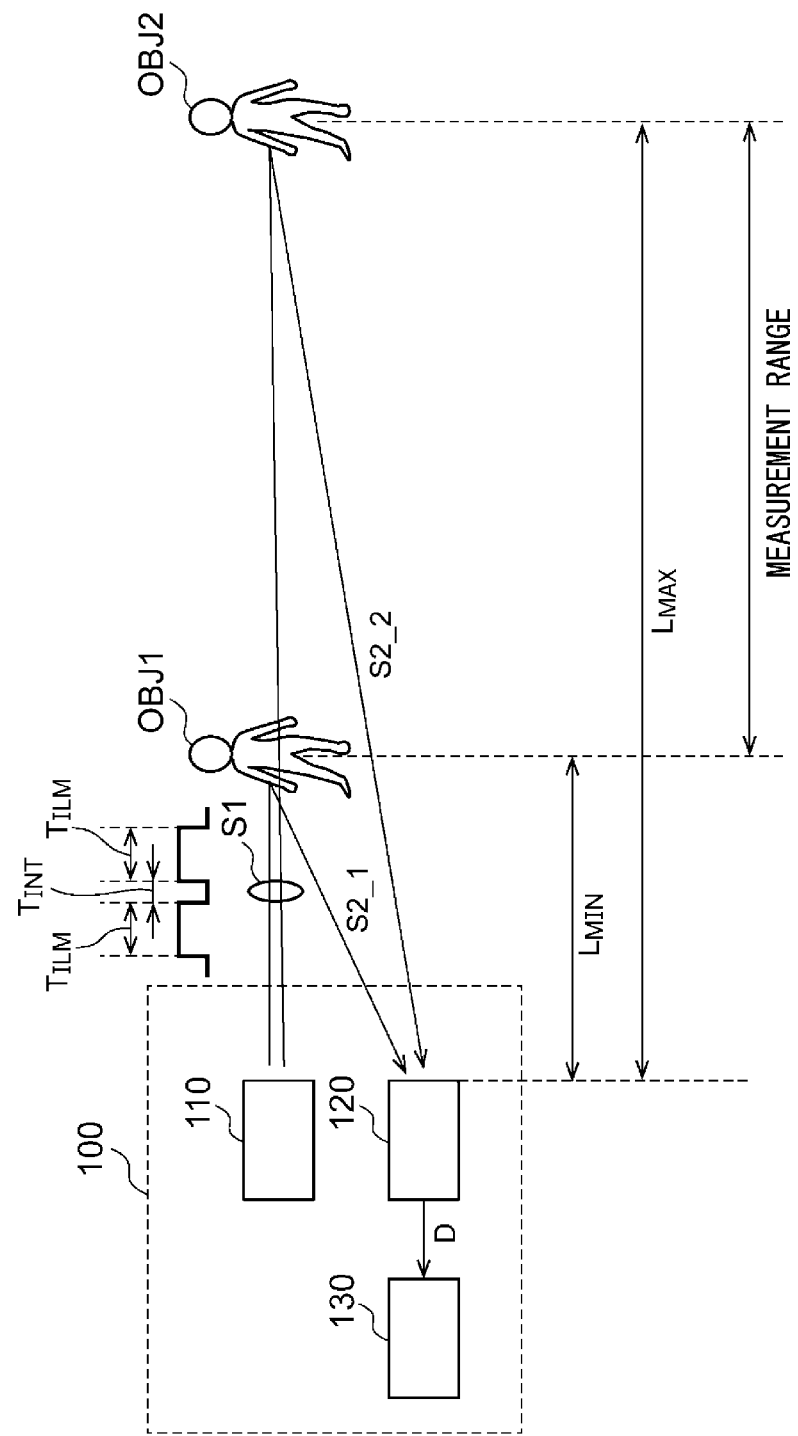
FIG. 4 is a diagram for explaining the measurement of an object supported by the imaging apparatus.

FIG. 4 is a diagram for explaining the measurement of the object OBJ by the imaging apparatus 100. Description will be made assuming that the measurement range in the depth direction of the imaging apparatus 100 is limited to a range of $L_{MIN}$ to $L_{MAX}$ as a specification.

The round-trip time (maximum round-trip time) $T_{MAX}$ to and from an object OBJ2 at a position that corresponds to the upper limit $L_{MAX}$ of the sensing distance is represented by $T_{MAX}=2\times L_{MAX}/c$. The round-trip time (minimum round-trip time) $T_{MIN}$ to and from an object OBJ1 at a position that corresponds to the lower limit $L_{MIN}$ of the sensing distance is represented by $T_{MIN}=2\times L_{MIN}/c$.

As an example, in a case in which $L_{MIN}$=1.5 m, and $L_{MAX}$=60 m, the minimum round-trip time TMIN is 2×1.5/(3×10$^8$)=10 ns, and the maximum round-trip time $T_{MAX}$ is 2×60/(3×10$^8$)=400 ns. The length of the interval period $T_{INT}$ is determined to be equal to or longer than the maximum round-trip time $T_{MAX}$.

Figure 5:
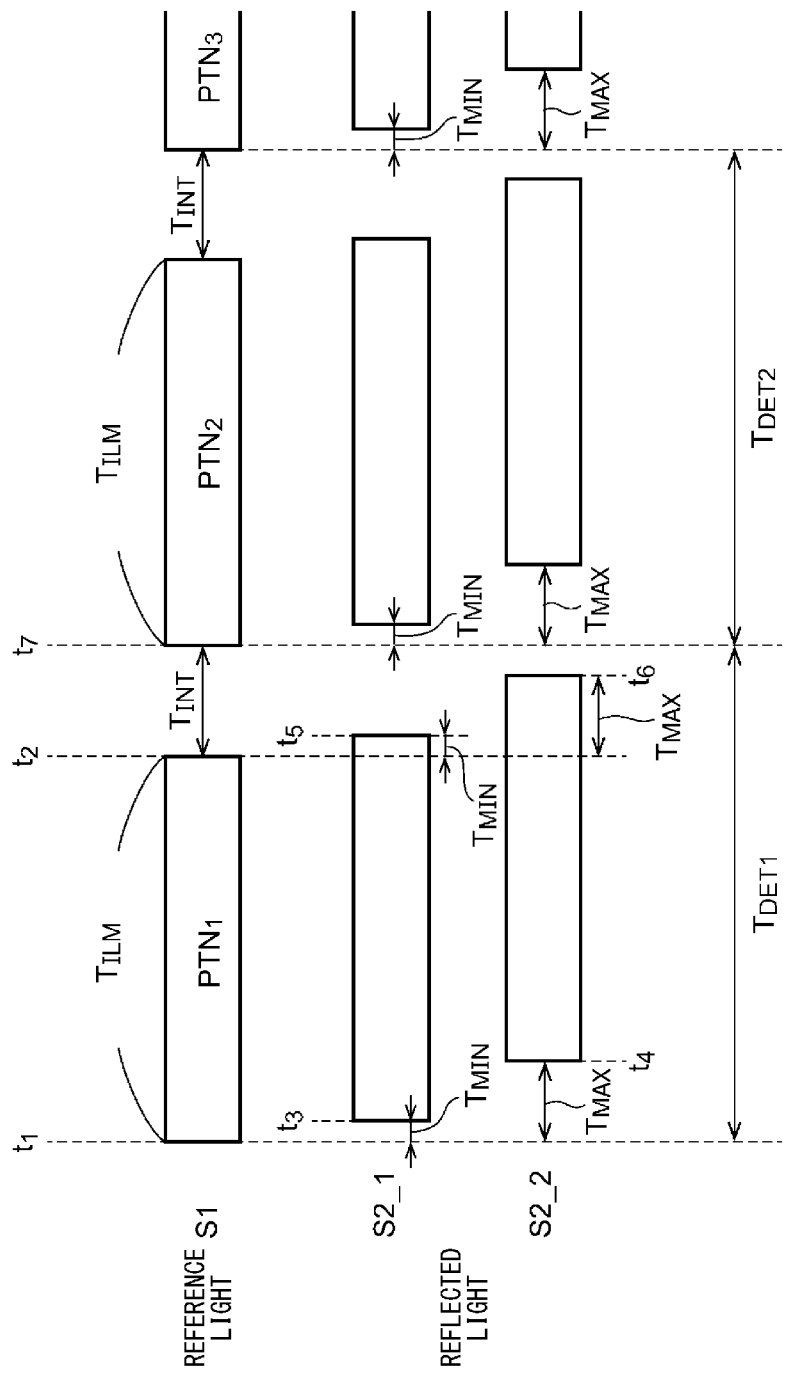
FIG. 5 is a time chart for explaining the operation of the imaging apparatus.

FIG. 5 is a time chart for explaining the operation of the imaging apparatus 100. During a period from the time point $t_1$ to the time point $t_2$, the random pattern $PTN_1$ is irradiated. The reference light S1 departing from the illumination apparatus 110 at the time point $t_1$ is reflected by the near-side object OBJ1, and returns to the photodetector 120 as reflected light S2_1 at the time point $t_3$ after the round-trip time $T_{MIN}$ elapses from the time point $t_1$. Furthermore, the reference light S1 departing from the illumination apparatus 110 at the time point $t_1$ is reflected by the far-side object OBJ2, and returns to the photodetector 120 as reflected light S2_2 at the time point $t_4$ after the round-trip time $T_{MAX}$ elapses from the time point $t_1$.

The reference light S1 departing from the illumination apparatus 110 at the time point $t_2$ is reflected by the near-side object OBJ1, and returns to the photodetector 120 as reflected light S2_1 at the time point $t_5$ after the round-trip time $T_{MIN}$ elapses from the time point $t_2$. Furthermore, the reference light S1 departing from the illumination apparatus 110 at the time point $t_2$ is reflected by the far-side object OBJ2, and returns to the photodetector 120 as reflected light S2_2 at the time point $t_6$ after the round-trip time $T_{MAX}$ elapses from the time point $t_2$.

Subsequently, at the time point $t_7$ after the interval period $T_{INT}$ elapses from the time point $t_2$, the irradiation of the next random pattern $PTN_2$ is started.

For example, the interval period $T_{INT}$ may be designed to be longer than the round-trip time $T_{MAX}$. The upper limit of the interval period $T_{INT}$ is not restricted in particular. As the interval period $T_{INT}$ becomes longer, the effect of the reflected light from an object that exists outside the measurement range can be reduced. However, if the interval period $T_{INT}$ is excessively long, this leads to a reduction of the illumination time $T_{ILM}$ or a reduction of the frame rate. For example, in a case in which $T_{MAX}$=400 ns, $T_{INT}$ may be designed to be 0.5 ms. In a case in which the random pattern is switched with a frequency of 400 Hz, $T_{ILM}$ becomes 2.5 ms−0.5 ms=2 ms.

In a case in which the relation $T_{INT}>T_{MAX}$ holds true, the reflected light S2_2 from the object OBJ2 returns to the photodetector 120 before the time point $t_7$. Accordingly, if the detection period $T_{DET1}$ is set in a period from $t_1$ to $t_7$, this allows the reflected light S2_1 and S2_2 to be detected based on only the same random pattern $PTN_1$. In other words, such an arrangement is capable of eliminating interference between temporally adjacent random patterns, thereby providing improved image quality.

It should be noted that, for each detection cycle, the start point of the detection period $T_{DEI}$ may be set in a period from $t_1$ to $t_3$, and the end point of the detection period $T_{DET}$ may be set in a period from $t_6$ to $t_7$.

Strictly speaking, the length of the interval period $T_{INT}$ may preferably be designed to be longer than $T_{MAX}-T_{MIN}$.

Next, description will be made regarding a modification of the sensing by the imaging apparatus 100.

MODIFICATION 1

The start point of the detection period $T_{DET}$ may be dynamically determined according to the distance to the object OBJ. Specifically, as the start point of the detection period $T_{DET}$, a time point at which the reflected light from the object OBJ that is closest to the imaging apparatus 100 reaches the photodetector 120 may be employed.

Figure 6:
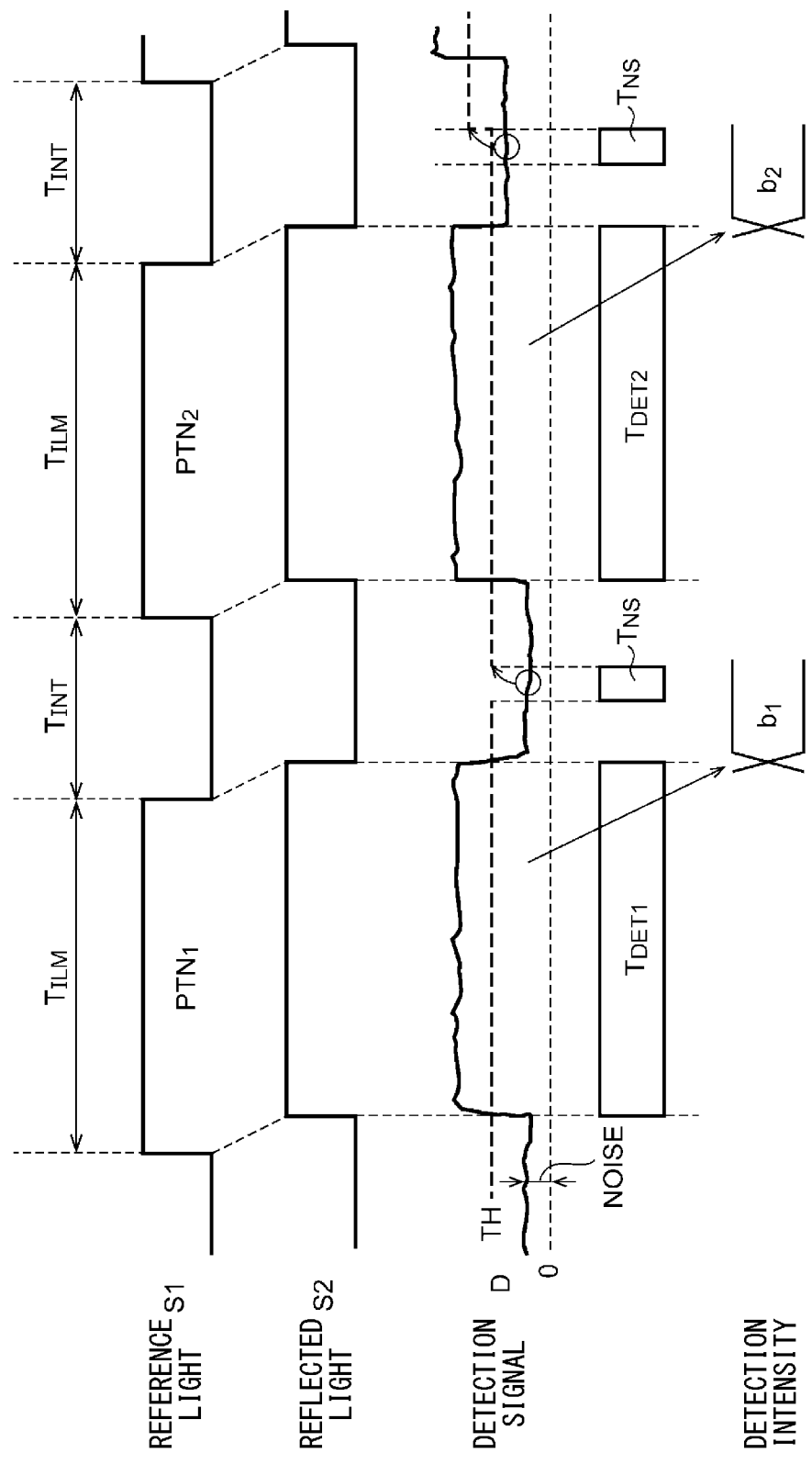
FIG. 6 is a time chart for explaining the operation of an imaging apparatus according to a modification 1.

FIG. 6 is a time chart for explaining the operation of the imaging apparatus 100 according to a modification 1. Description will be made assuming that, during the interval period $T_{INT}$, the reference light S1 is completely turned off. With this, during the interval period $T_{INT}$, no reflected light S2 is input to the illumination apparatus 110, and only ambient light (disturbance noise) is input to the illumination apparatus 110. That is to say, it can be said that the detection signal D acquired in the interval period $T_{INT}$ is small as compared with that acquired in a period in which the reflected light S2 that occurs due to the reflection of the random pattern is input to the illumination apparatus 110. In other words, it can be said that a sudden increase in the detection signal D at a given time point means that the reflected light S2 from the object OBJ has been input to the photodetector 120.

Accordingly, the processing device 130 monitors the detection signal D of the photodetector 120, and sets a timing at which the design signal D increases from a noise level to a significant signal level as the start point of the detection period $T_{DET}$. For example, the processing device 130 may set a threshold value TH between the noise level and the significant signal level. When D becomes larger than TH, the processing device 130 may start the detection period $T_{DET}$.

Also, the processing device 130 may monitor the output signal D of the photodetector 120 so as to set a timing at which the output signal D decreases to the noise level from the significant signal level as an endpoint of the detection period $T_{DET}$. For example, when D becomes smaller than TH, the processing device 130 may end the detection period $T_{DET}$.

For example, the processing device 130 may sample and acquire the detection signal D during the detection period $T_{DET}$ thus set, and may generate the detection intensity br based on the multiple sampling values.

In this example, the processing device 130 may dynamically change the threshold value TH. For example, the processing device 130 may set a noise detection period $T_{NS}$ in which noise is to be detected in the interval period $T_{INT}$. The detection signal D measured in the noise detection period $T_{NS}$ may be employed as the noise level. Also, the threshold TH to be used for the next detection period $T_{DET}$ may be set based on the noise level thus acquired. For example, the noise level may be offset by a predetermined level, and the noise level with such an offset may be employed as the threshold value TH. Also, a value obtained by multiplying the noise level by a predetermined value may be employed as the threshold value TH.

With the modification 1, acquisition of unnecessary light is reduced, thereby allowing the effects of noise or the like to be reduced.

MODIFICATION 2

Figure 7:
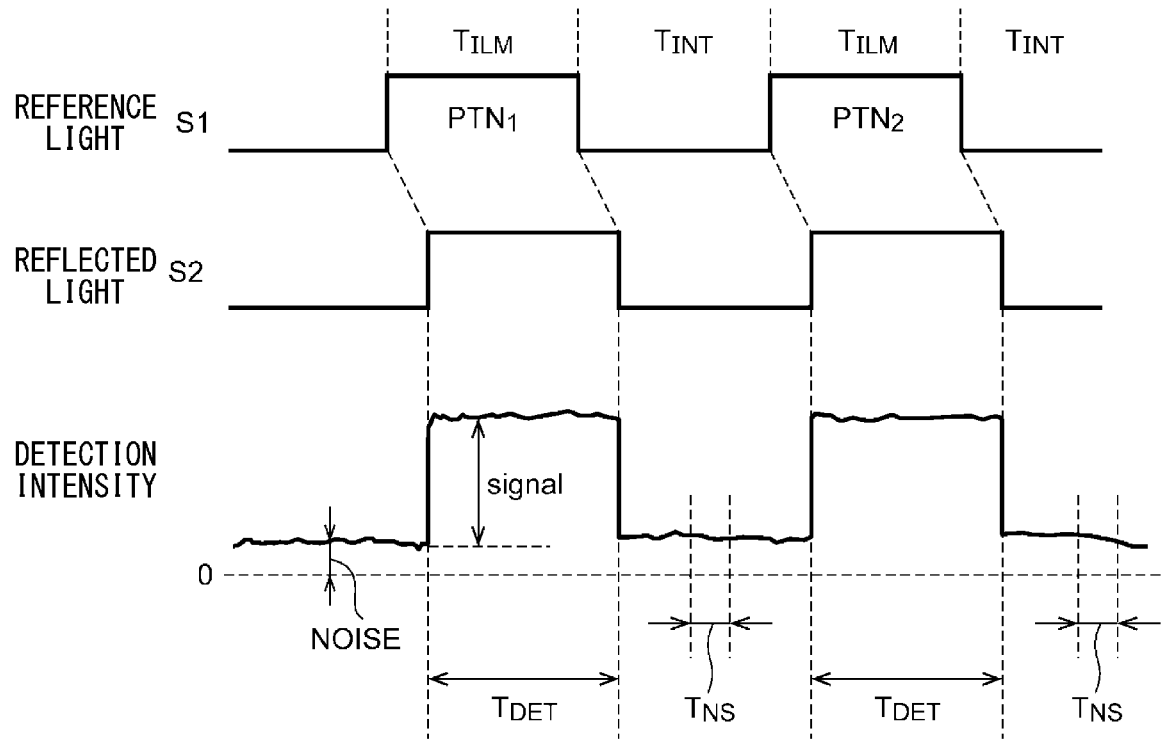
FIG. 7 is a time chart for explaining the operation of an imaging apparatus according to a modification 2.

FIG. 7 is a time chart for explaining the operation of the imaging apparatus 100 according to a modification 2. In the modification 2, during the interval period $T_{INT}$, the light intensity of the reference light S1 is also zero. The noise detection period $T_{NS}$ is provided in a period in which no reflected light S2 returns (which will be referred to as a "non-detection period"). In this period, the noise level of the detection signal D is measured. The detection signal D, i.e., the detection intensity b, is corrected based on the noise level thus measured. The detection period $T_{DET}$ may be set using the technique described in Modification 1. Other periods may also be used as non-detection periods.

For example, the value of the detection signal D sampled in the noise detection period $T_{NS}$ (i.e., the noise level) may be subtracted from the detection signal D sampled in the detection period $T_{DET}$. The detection intensity br may be generated based on the detection signal D thus subjected to the subtraction.

Alternatively, the value of the detection signal D is sampled and integrated over the noise detection period $T_{NS}$, and a noise correction value N is generated based on the integrated value. Furthermore, the detection signal D is sampled and integrated over the detection period $T_{DET}$, so as to generate the detection intensity br including noise. Subsequently, the noise correction value N may be subtracted from the detection intensity br including noise, so as to generate a corrected detection intensity br. The noise correction value N is scaled based on the ratio between the length of the detection period $T_{DET}$ and the length of the noise detection period $T_{NS}$.

For example, the illumination period $T_{ILM}$ and the interval period $T_{INT}$ may be designed to have the same length. In this case, the detection period $T_{DET}$ and the non-detection period can be set to have the same length. With this, the non-detection period may be set as the noise detection period $T_{NS}$. In this case, the detection period $T_{DET}$ and the noise detection period $T_{NS}$ have the same length. This requires no scaling of the noise correction value N, thereby providing simple processing.

Usage

Figure 8:
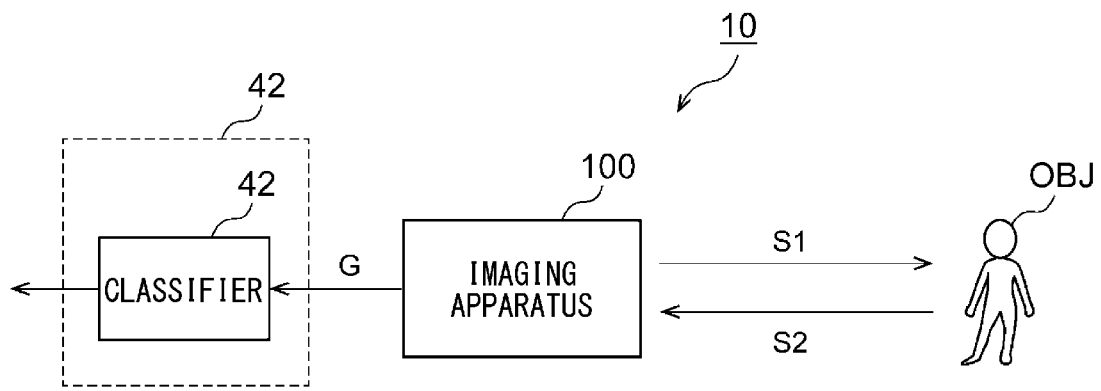
FIG. 8 is a block diagram showing an object identification system.

Next, description will be made regarding the usage of the imaging apparatus 100. FIG. 8 is a block diagram showing an object identification system 10. The object identification system 10 is mounted on a vehicle such as an automobile, motorcycle, or the like. The object identification system 10 judges the kind (category) of an object OBJ that exists in the vicinity of the vehicle.

The object identification system 10 includes the imaging apparatus 100 and a processing device 40. As described above, the imaging apparatus 100 irradiates the reference light S1 to the object OBJ, and detects the reflected light S2, so as to generate a reconstructed image G.

The processing device 40 processes the output image G output from the imaging apparatus 100, and judges the position and the kind (category) of the object OBJ.

A classifier 42 included in the processing device 40 receives the image G as its input, and judges the position and the kind of the object OBJ included in the image G. The classifier 42 is implemented based on a model generated by machine learning. The algorithm employed by the classifier 42 is not restricted in particular. Examples of algorithms that can be employed include You Only Look Once (YOLO), Single Shot MultiBox Detector (SSD), Region-based Convolutional Neural Network (R-CNN), Spatial Pyramid Pooling SPPnet), Faster R-CNN, Deconvolution-SSD (DSSD), Mask R-CNN, etc. Also, other algorithms that will be developed in the future may be employed.

The above is the configuration of the object identification system 10. With such an arrangement employing the imaging apparatus 100 as a sensor of the object identification system 10, this provides the following advantages.

With such an arrangement employing the imaging apparatus 100, i.e., a quantum radar camera, this provides dramatically improved noise resistance. For example, when the vehicle travels in rain, snow, or fog, it is difficult to recognize the object OBJ with the naked eye. In contrast, with such an arrangement employing the imaging apparatus 100, this allows a reconstructed image G of the object OBJ to be acquired without the effects of rain, snow, or fog.

Also, with such an arrangement structured to employ the imaging apparatus 100 according to the embodiment, this prevents the occurrence of interference between the temporally adjacent random patterns, thereby providing improved image quality.

Figure 9:
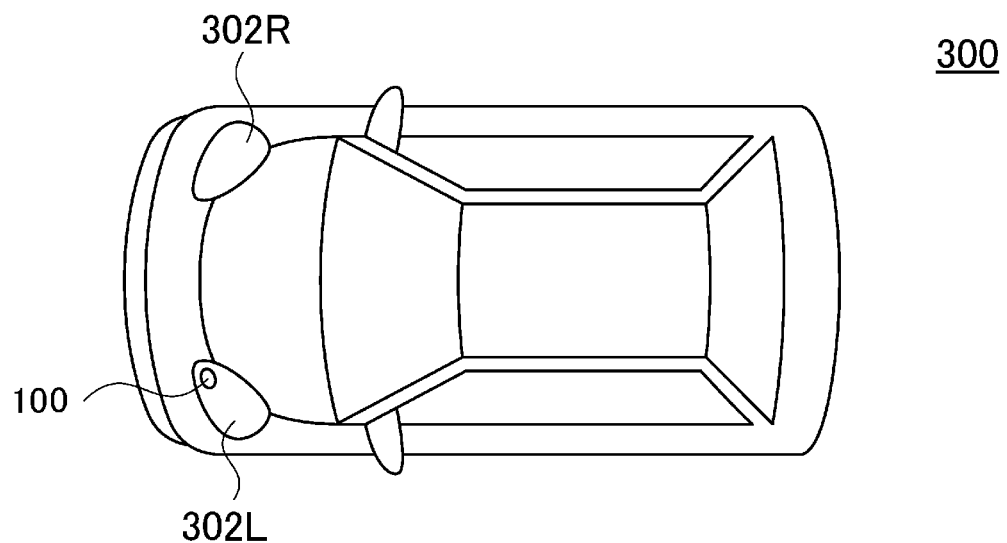
FIG. 9 is a block diagram showing an automobile provided with the object identification system.

FIG. 9 is a block diagram showing an automobile provided with the object identification system 10. An automobile 300 is provided with headlamps 302L and 302R. The imaging apparatus 100 is built into at least one from among the headlamps 302L and 302R. Each headlamp 302 is positioned at a frontmost end of the vehicle body, which is most advantageous as a position where the imaging apparatus 100 is to be installed for detecting an object in the vicinity.

Figure 10:
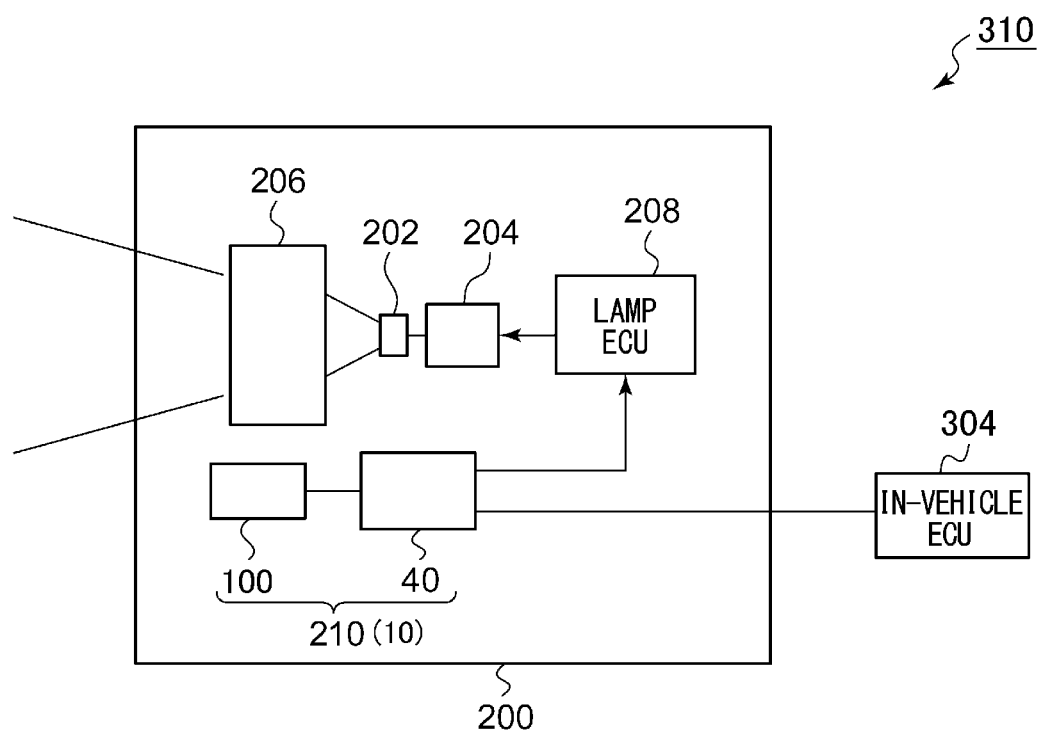
FIG. 10 is a block diagram showing an automotive lamp provided with an object detection system.

FIG. 10 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the imaging apparatus 100 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the illumination apparatus 110 is configured as a combination of the light source 112 and the patterning device 114. However, the present invention is not restricted to such an arrangement. For example, the illumination apparatus 100 may be configured as an array of multiple semiconductor light sources (light-emitting diodes (LEDs) or laser diodes (LDs)) arranged in a matrix, and may be configured to be capable of controlling the on/off state (or luminance) of each semiconductor light source.

Description has been made in the embodiment regarding a method using the correlation calculation as a ghost imaging (or single-pixel imaging) method. However, the image reconstruction method is not restricted to such an arrangement. In some embodiments, instead of such a correlation calculation, the image may be reconstructed by an analytical method using a Fourier transform or inverse Hadamard transform, a method for solving an optimization problem such as sparse modeling, or an algorithm using AI or machine learning.

Description has been made regarding the present disclosure based on the embodiments using specific terms. However, the above-described embodiments show only a principle and an application of the present disclosure and/or the present invention. Rather, various modifications and various changes in the layout can be made without departing from the spirit and scope of the present invention defined in appended claims.

What is claimed is:

1. An in-vehicle imaging apparatus comprising:
an illumination apparatus structured to irradiate reference light having a random pattern to be switched for each illumination period having a first length of time;
a photodetector structured to detect reflected light from an object and to generate a detection signal; and
a processing device structured to reconstruct a reconstructed image of the object based on a detection intensity based on the detection signal and a light intensity distribution of the reference light,
wherein an interval period in which the light intensity of the reference light is set to zero or the reference light has a uniform light intensity distribution is inserted between irradiation periods,
wherein, with an upper limit of a sensing distance in a depth direction of the in-vehicle imaging apparatus as $L_{MAX}$, and with the speed of light as c, the interval period is designed to be equal to or larger than $2 \times L_{MAX}/c$,
and wherein the processing device is structured to start a detection period having a second length of time when the detection signal exceeds a threshold value, and to reconstruct the reconstructed image of the object based on the detection intensity generated in the detection period and the light intensity distribution of the reference light during the detection period according to equation (1)

$$G(x, y) = \frac{1}{M} \sum_{r=1}^{M} [\{b_r - \langle b \rangle\} \cdot I_r(x, y)] \quad (1)$$

$$\langle b \rangle = \frac{1}{M} \sum_{r=1}^{M} b_r$$

wherein $b_r$ represents the detection intensity at r-th irradiation, $I_r$ represents the light intensity distribution of the reference light at r-th irradiation, and M represents the number of irradiation during the detection period.

2. The in-vehicle imaging apparatus according to claim 1, wherein, when the detection intensity becomes lower than a threshold value, the processing device ends the detection period.

3. The in-vehicle imaging apparatus according to claim 1, wherein the threshold value is set based on the detection intensity acquired in the interval period.

4. The in-vehicle imaging apparatus according to claim 1, wherein, in the interval period, the reference light has a light intensity of zero,
and wherein the processing device corrects the detection intensity to be used for reconstruction of the reconstructed image using the detection intensity acquired in the interval period.

5. The in-vehicle imaging apparatus according to claim 4, wherein the illumination period and the interval period have an equal length.

6. An automotive lamp provided with the in-vehicle imaging apparatus according to claim 1.

7. An automobile provided with the in-vehicle imaging apparatus according to claim 1.

* * * * *